Figure 1:
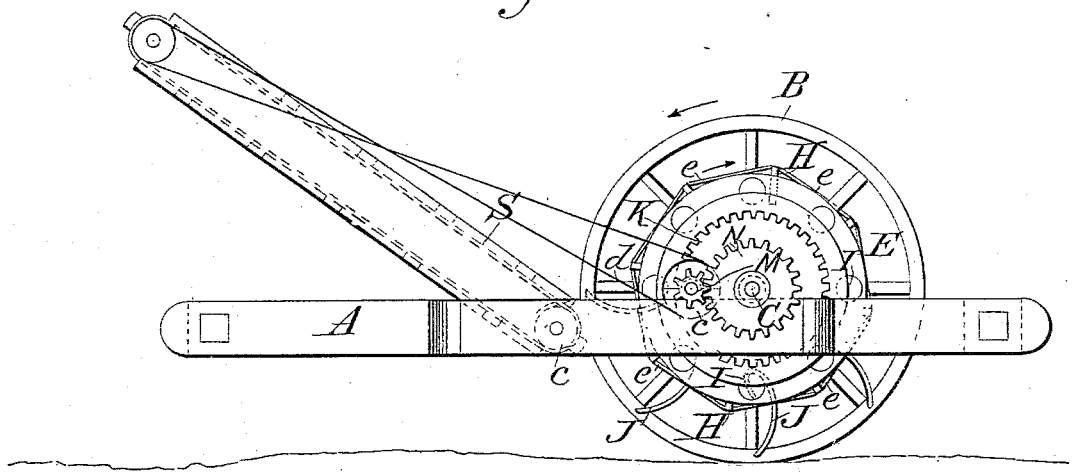

(No Model.) 2 Sheets—Sheet 1.

T. A. CARTER.
HAY LOADER.

No. 359,843. Patented Mar. 22, 1887.

Witnesses
F. H. Schott
P. E. Stevens

Inventor
Theodore A. Carter
By his Attorney W. X. Stevens.

(No Model.) 2 Sheets—Sheet 2.

T. A. CARTER.
HAY LOADER.

No. 359,843. Patented Mar. 22, 1887.

Witnesses
F. H. Schott
P. E. Stevens

Inventor
Theodore A. Carter
By his Attorney W. X. Stevens

N. PETERS, Photo-Lithographer, Washington, D. C.

UNITED STATES PATENT OFFICE.

THEODORE A. CARTER, OF RED OAK, IOWA.

HAY-LOADER.

SPECIFICATION forming part of Letters Patent No. 359,843, dated March 22, 1887.

Application filed June 3, 1886. Serial No. 204,010. (No model.)

*To all whom it may concern:*

Be it known that I, THEODORE A. CARTER, a citizen of the United States, residing at Red Oak, in the county of Montgomery and State of Iowa, have invented certain new and useful Improvements in Hay-Loaders; and I do hereby declare the following to be a full, clear, and exact description of the invention, such as will enable other skilled in the art to which it appertains to make and use the same.

This invention relates to that class of hay-loaders officially termed "lifting-reel hay-loaders."

Heretofore it has been common to mount a cylinder upon the wheel-axle to revolve therewith, the said cylinder being provided with teeth hung upon pivots in the cylinder, to be operated by a cam to project radially while at work and to fold in at certain other times; but such teeth, being forced down into the hay by the advancing wheels, act merely as forks to pick up the hay and carry it up behind the cylinder to deposit it on an endless belt; or they act in combination with an actual rake hung behind the cylinder to force the hay up in front of the curved rake-teeth; but such cylinder-teeth do not move forward to act directly upon the hay when on the ground to rake and lift it. It has also been common to mount one or more cylinders on a carriage at some distance from the axle thereof, and to provide them with teeth, or to mount toothed belts on the cylinders to revolve in a direction opposite to the carriage-wheels, thereby acting as both rakes and lifters; but when a rake is mounted on wheels to touch the ground at a point behind the axle the rake-teeth will drag heavily upon every knoll while the wheels descend into a hollow, and when the wheels ascend another knoll or ridge the rake will be lifted too high from the ground to do service, and if the rake be hung forward of the axle a similar result will follow in inverse order of action to that just named.

To avoid these objections, the object of my invention is to provide means whereby a lifting-reel hung concentric with the axle may be adapted to act directly upon the hay on the ground, to rake forward and lift the hay up to a belt or carrier, which shall further lift it to such a height as to deposit it on a wagon or load of hay.

To this end my invention consists in the construction and combination of parts forming a hay-loader, hereinafter described and claimed, reference being had to the accompanying drawings, in which—

Figure 2:
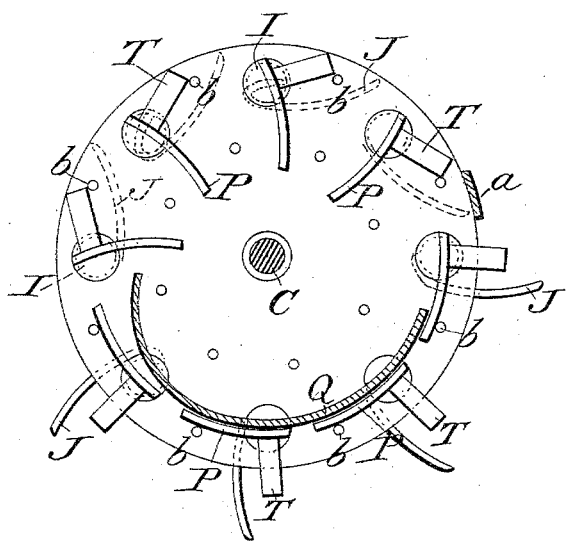
Figure 3:
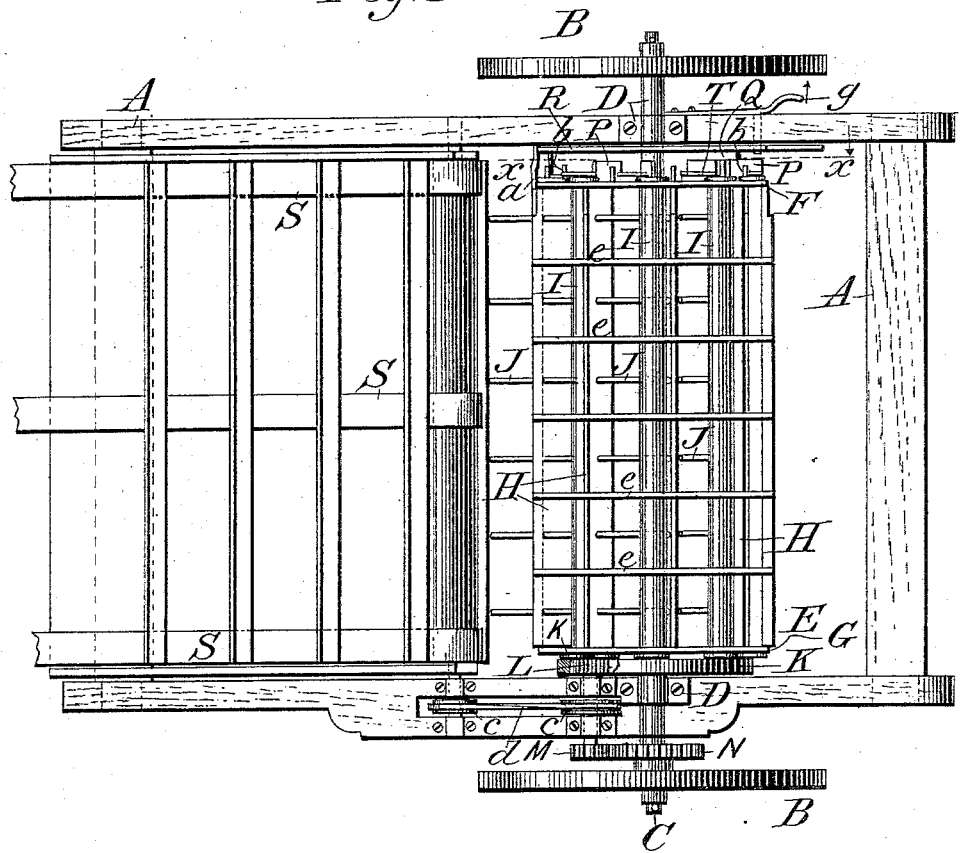
Figure 4:
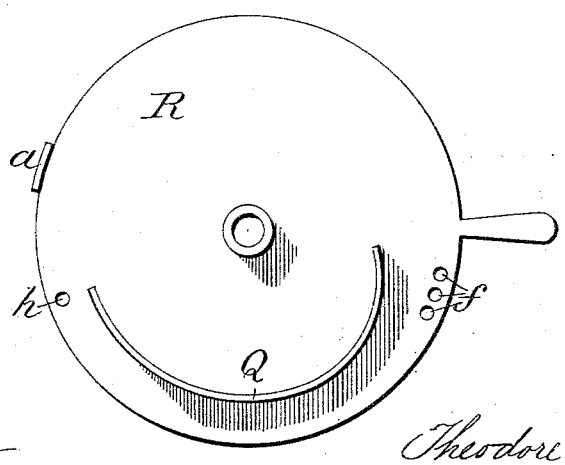

Figure 1 is a side elevation of my hay-loader without the near wheel. Fig. 2 is a longitudinal vertical section at the line $x$ $x$ of Fig. 3. Fig. 3 is a plan view of the machine, and Fig. 4 is a detail view of the cam for operating the teeth.

A represents the frame of the machine mounted on two wheels, B, which turn freely on the axle C. This axle is journaled to revolve in bearings D of the frame A, and the reel E is rigidly secured upon the axle. This reel comprises two heads, F G, cross-bars H, rigidly connecting the heads, and a series of rake-heads, I, provided with teeth J. The rake-heads I are journaled in the reel-heads F G, to oscillate so that the rake-teeth J may project radially from the cylinder when on its lower side; or they may close in against the bars H when on the upper side.

K represents an internally-toothed gear-wheel fixed upon the end of the reel, concentric therewith.

L is a pinion journaled in the frame A, to engage the teeth of wheel K. M is a similar pinion fixed on the opposite end of the shaft of the pinion L.

N is a spur-wheel, fixed to one of the wheels B, which is mounted to revolve freely on the axle and serves as a drive-wheel, the said spur-wheel engaging the pinion M. By this means the reel is revolved by the advance of the carriage in a direction opposite to the revolution of the wheels upon the same axle.

As each rake I approaches the ground its teeth are caused to project radially from the cylinder by an arm, P, attached to the rake-head, and a cam, Q, which is fixed to the face of a disk or cam-plate, R. A portion of the cam being an arc of a circle concentric with the axle C, and each arm P having a similar curve and hanging rearward radially from the rake-head, the rake-teeth will be maintained in a radially-projecting position so long as the arm P is passing the cam, and that is arranged to be during such an arc of the circle of the reel as will cause each set of rake-teeth first to drag on the ground as a rake and then to carry forward and upward the hay thereby gathered until the same is above the lower part of the delivery-belt S. Then the arm P, having passed the cam, no longer resists the tendency of the load on the teeth to tip them backward, and the load is dropped upon the belt S to be elevated and dropped upon the wagon or load.

To insure the tipping of the teeth to discharge at the right time when the load is very light, I provide each rake-head with another radial arm, T, nearly at right angles to the arm P, and in the general radial plane of the rake-teeth, and I fix a lug, $a$, to the cam-plate in the path of the arms T, whereby each rake will be tipped backward automatically on arriving at the elevation over the delivery-belt required to discharge the hay thereon. The arm T will rest on a pin, $b$, projecting from the reel-head, until, in revolving backward, it, with the teeth, falls outward into position for service, or until the arm P again engages the cam and the rake-teeth are automatically forced out to their working position.

The delivery-belt S is a mere accessory to my invention, and is supposed to be common. I have shown pulleys $c$ and a belt, $d$, whereby the belt S may be rotated.

$e$ represents a series of hoops surrounding the reel and secured to the bars H thereof, to keep the hay, when in bunches on the field, from being crowded into the reel. These hoops may be mere wires, or they may be wide or narrow hoops of wood or iron.

The cam-plate R is journaled to revolve on the axle C, and has a series of notches, $f$, in it to be engaged by a spring-detent, $g$, whereby the cam may be moved circumferentially and be set, as required, to cause the teeth to begin raking and to deliver their respective loads sooner or later.

$h$ is another notch on the opposite edge of the cam-plate to the notches $f$, to be engaged by the detent $g$, whereby the cam may be held inverted, so as not to force the teeth to project while traveling with the machine.

This hay-loader is to be attached to the rear end of the hay-wagon, and where the hay-crop is heavy it may be drawn all over the field to gather the hay; but when the hay is light it should first be raked into a windrow, and then this machine should be drawn astride the row to gather and load it.

The operation of the machine has been fully described in describing the functions of its parts.

I am aware that toothed reels have been journaled concentrically with the drive-wheels to revolve backward, and that rakes have been pivoted in reels and actuated by cams to project and to close in at suitable times, and I do not claim either of these, broadly, as my invention.

What I claim, and desire to secure by Letters Patent, is—

1. The combination of the frame A, the axle C, journaled therein, the wheels B, journaled loosely on the said axle, the reel E, firmly fixed upon the axle and concentric therewith, the rakes I, journaled in the reel and provided with the teeth J and arms P and T, the plate R, provided with the cam Q in the path of the arms P, the lug $a$, fixed in the path of the arms T, the elevator-belt S, mounted upon the frame A, forward of the reel-rakes, with its receiving end at their delivery-point, the gear-wheels K, secured to the reel, the gear-wheel N, secured to one of the wheels B, and the connecting-gears L and M, substantially as shown and described.

2. The combination of the reel E, the rakes I, mounted therein, and provided with the teeth J, the curved radial arms P and the arms T, standing nearly at right angles to each other, the plate R, provided with the cam Q in the path of the arms P, the lug $a$, fixed in the path of the arms T, the stop-notches $f$ and $h$ at opposite edges of the said plate, and the spring-detent $g$, adapted to engage the said notches, substantially as shown and described.

In testimony whereof I affix my signature in presence of two witnesses.

THEODORE A. CARTER.

Witnesses:
W. R. STEVENS,
THEO. MUNGEN.